United States Patent [19]
Dickinson

[11] 3,797,564
[45] Mar. 19, 1974

[54] ADJUSTABLE SOFT PACKING SEAL

[76] Inventor: Harry C. Dickinson, 3137 Cleveland Ave., Michigan City, Ind. 46360

[22] Filed: Apr. 17, 1972

[21] Appl. No.: 244,635

[52] U.S. Cl............... 165/82, 165/158, 285/93, 285/137 R, 285/138, 285/348, 285/363
[51] Int. Cl............................................. F28f 7/00
[58] Field of Search........ 285/137 R, 93, 41, 133 R, 285/138, 348, 351, 363, 139; 165/159, 82

[56] References Cited
UNITED STATES PATENTS

| | | | |
|---|---|---|---|
| 3,327,777 | 6/1967 | Kovolik et al. | 165/158 X |
| 2,177,508 | 10/1939 | Abbott | 285/348 X |
| 3,187,810 | 6/1965 | Helin et al. | 165/158 |
| 3,377,087 | 4/1968 | Somerdyke et al. | 285/363 X |
| 2,496,154 | 1/1950 | Fermier | 285/93 X |
| 2,747,900 | 5/1956 | Smith | 285/348 |
| 2,954,742 | 10/1960 | Williams | 285/133 R X |
| 3,317,221 | 5/1967 | Brown | 285/341 X |

FOREIGN PATENTS OR APPLICATIONS

| | | | |
|---|---|---|---|
| 111,210 | 8/1925 | Switzerland | 165/158 |
| 111,261 | 7/1944 | Sweden | 165/158 |

Primary Examiner—Dave W. Arola

[57] ABSTRACT

A soft packing seal means for use in a rigid flange connection in fluid carrying piping and more particularly to piping having internal tubing carrying a separate fluid other than that carried in the piping, said seal means being externally adjustable without disturbing the rigid flange connection and providing visual means of detecting leakage.

4 Claims, 5 Drawing Figures

ADJUSTABLE SOFT PACKING SEAL

Background Of The Invention

In design of flange seals and particularly in flange seals used on in-line pipeline aftercoolers there are problems of non-rigid construction resulting in sagging and misalignment, causing binding of the internal tubing which in turn leads to failure of such junctions. It is desirable to have a flange connection for use in such installations with transversely movable internal gas carrying tubing whereby should any leakage occur at the flange it would be visibly detected and readily corrected by external adjustment without disrupting the rigidity of the external flange connection.

Summary Of Invention

According to the present invention there is provided a soft packing flange seal assembly for use with in-line pipeline aftercooler apparatus or similar apparatus where an expansible joint is desired with visual means of leakage detection and external adjusting means on a rigid construction.

Other provisions of this invention will be more apparent when taken in conjunction with the following more detailed description with the accompanying drawings wherein.

Description

Figure 1:
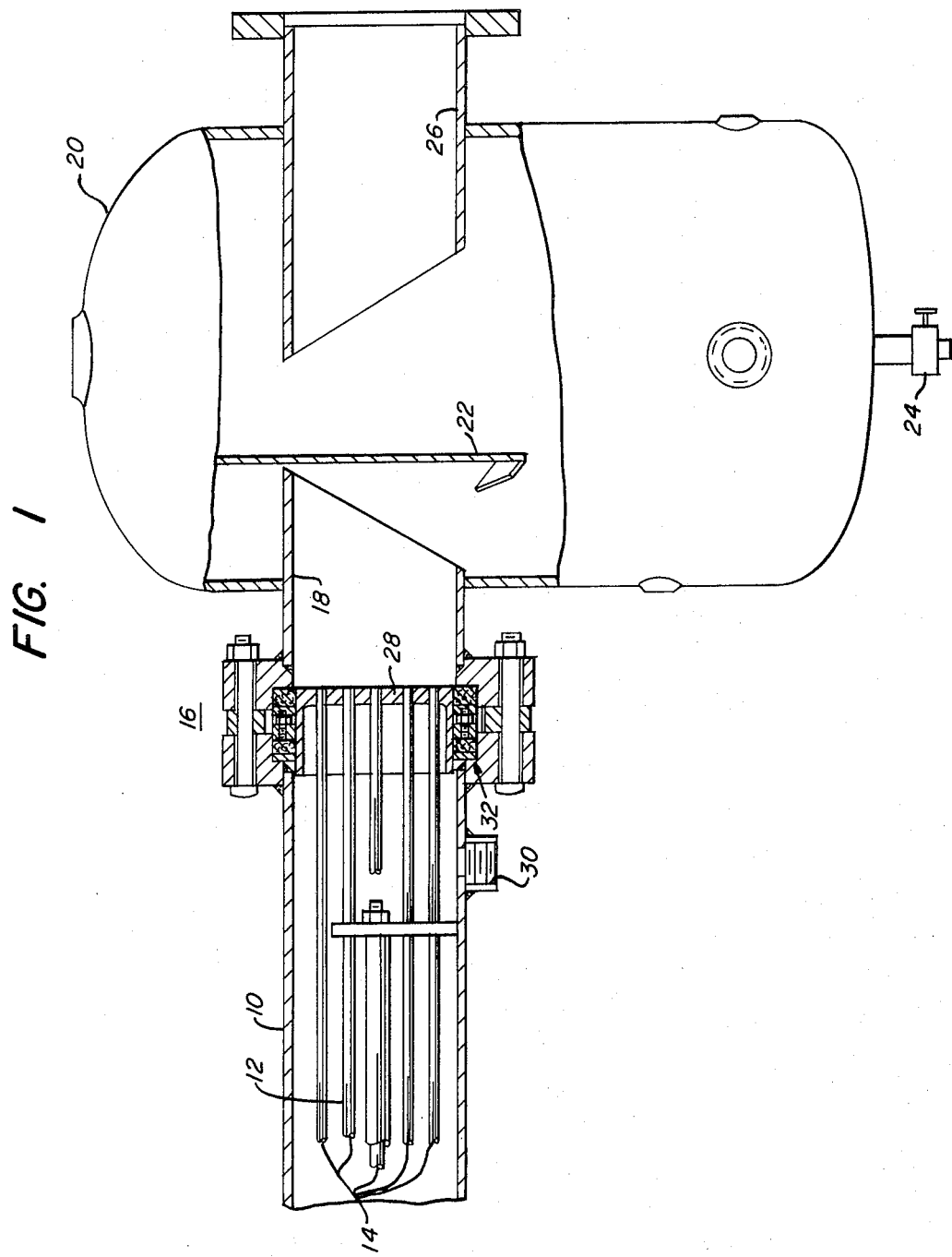
FIG. 1 is a plan view partly in section of the end of an in-line aftercooler as connected by the new seal assembly to a separator.

Referring to FIG. 1 there is shown the outer extremity of an aftercooler including the end section of in-line piping 10 having the tube bundle 12 of individual flow tubes 14 within the piping 10. An expansible joint 16 is shown securing the piping 10 to the intake conduit 18 of a moisture separator 20 having an internal baffle 22, a drain valve 24 and a discharge conduit 26.

Figure 2:
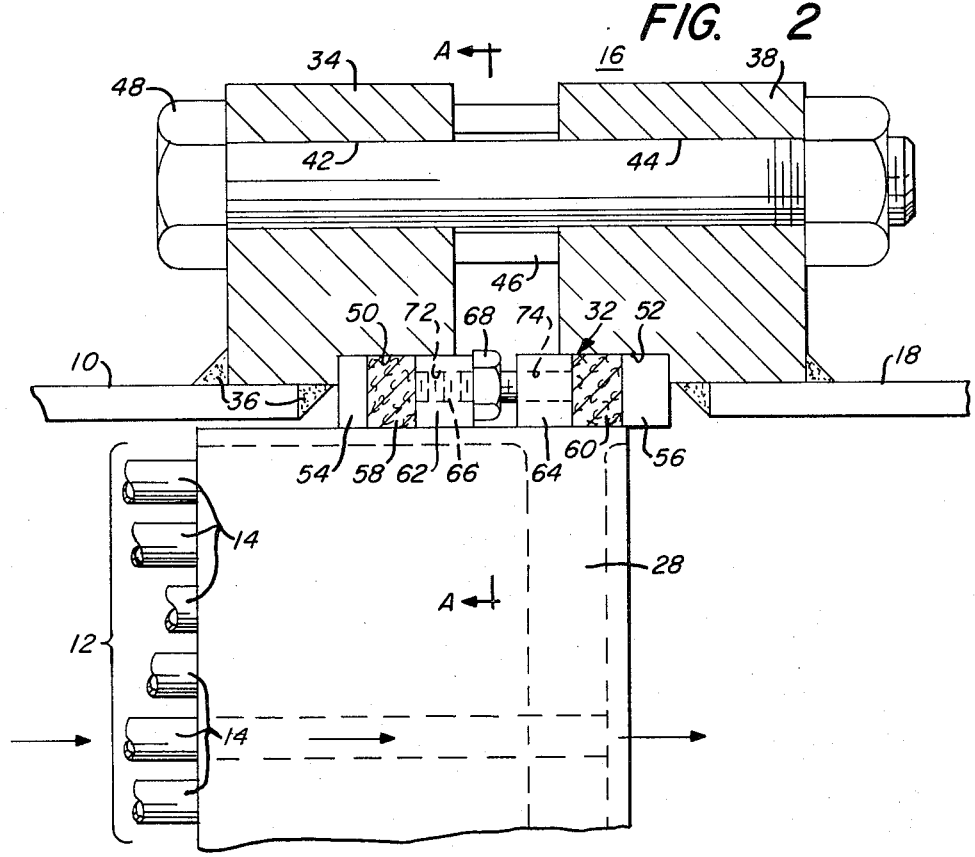
FIG. 2 is an enlarged sectional view of the new seal assembly with one embodiment of adjusting screw on the end of an in-line aftercooler.

The in-line pipe aftercooler is connected by suitable means at its inlet end to a source of heated gases such as a compressor discharge whereby the heated gases flow through the flow tubes 14 in the piping 10 to a circular floating end plate 28 within the piping 10. From the end plate 28 the gases flow to the intake conduit 18 of moisture separator 20 where condensed moisture in the gases are removed into the separator 20, the dried gases flowing to the discharge conduit 26 and then to any desired operating device. A cooling liquid flows from an inlet port 30 in the piping 10 surrounding the tube bundle 12 to a discharge port (not shown) and to suitable discharge sump (not shown). It is this flow of cooling fluid around the individual flow tubes 14 that cools the heated compressed gases within the flow tubes 14 to cause the condensation of the moisture therein that is removed by the separator 20. The cooling fluid is maintained in the piping 10 by any solid pack flange joint (not shown) at the inlet end and by the new soft packing seal 32 at the floating end plate 28, at the discharge end as is shown in FIG. 2. It is necessary to have an expansible joint 16 to allow for different conditions of heat expansion and cooling contraction of the flow tubes 14 secured to the floating end plate 28.

Figure 3:
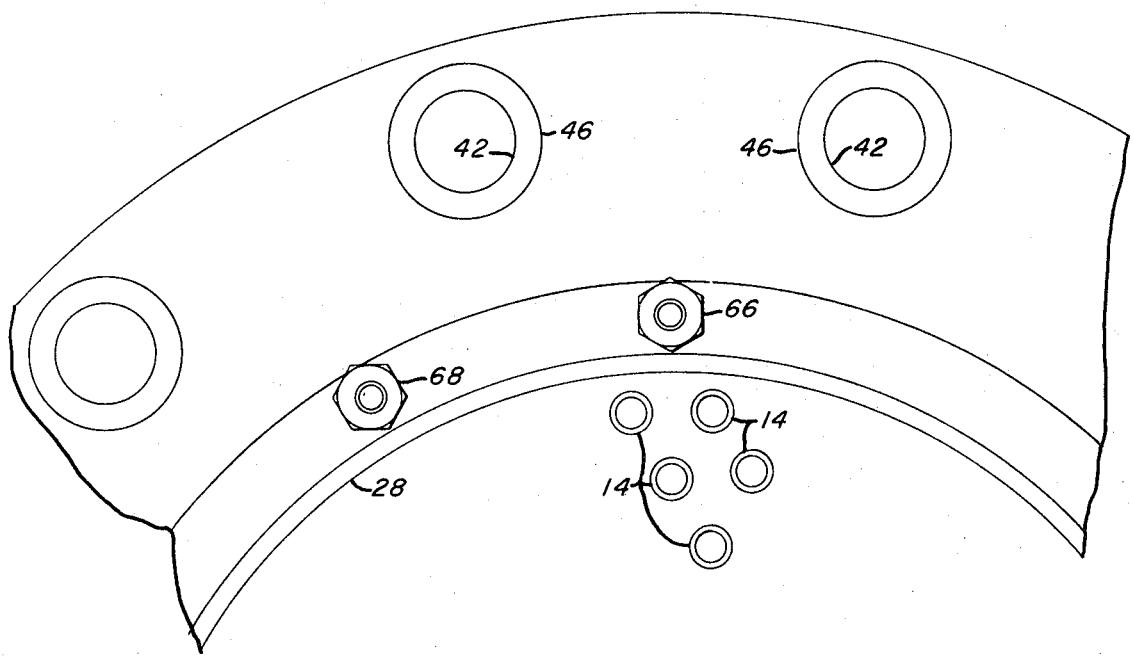
FIG. 3 is a partial section of back-up ring and compression rings taken through A—A of FIG. 2 showing the location of the flange bolts and adjustment screws.
Figure 4:
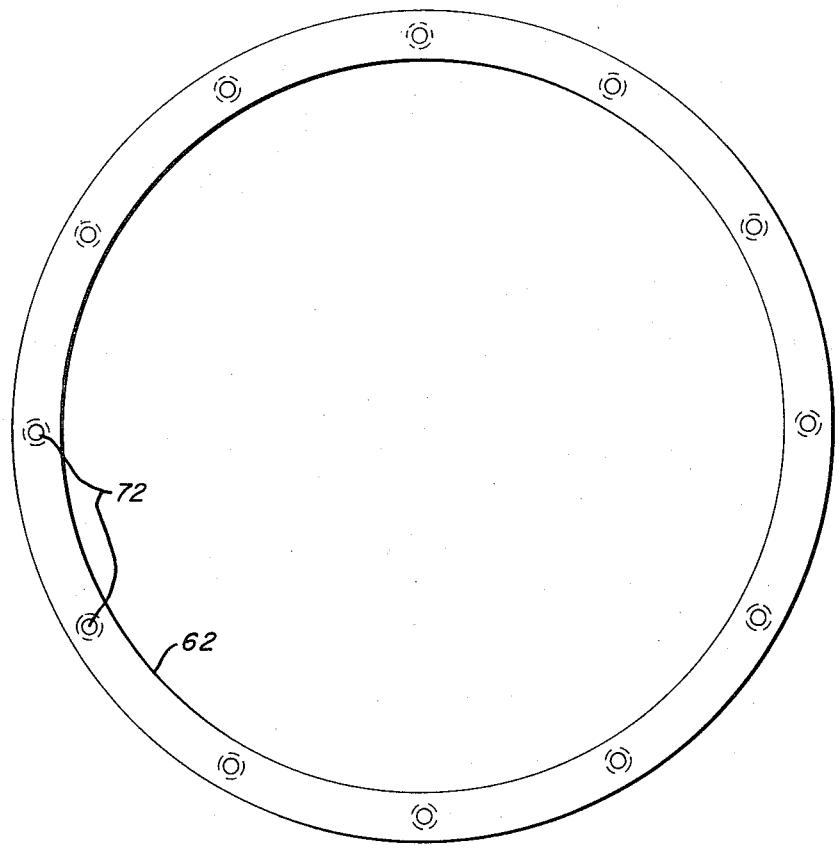
FIG. 4 is a view of a compression ring.

Referring to FIG. 2 the expansible joint 16 includes an aftercooler flange 34 secured to the piping 10 as by welds 36, and a separator flange 38 secured to the intake conduit 18 by welds 40. A plurality of annularly equally spaced bores 42 (FIG. 3) in the aftercooler flange 34 are aligned with opposite annularly equally spaced bores 44 in the separator flange 38. A spacer 46 is placed between each of aligned bores 42 and 44 and a bolt and nut 48 is inserted through each of the bores 42, spacer 46 and bore 44 and securely torqued to provide a rigid jointure of the piping 10 and the intake conduit 18. Located between the flanges 34 and 36 in recesses 50 and 52 at the inner diametrical surfaces thereof is the soft packing seal 32 comprised of outer backup rings 54 and 56, adjacent to soft packing rings 58 and 60 which in turn are adjacent to compression rings 62 and 64 separated by the adjustment screws 66 with the adjustment nuts 68 in an opening 70 between the compression rings 62 and 64. One of the compression rings 62, shown in FIG. 4 is adapted with threaded bores 72 annularly equally spaced thereon at a location to be situated between the bores 42 and 44 on the flanges 34 and 38. The bores 72 receive a plurality of adjustment screws 66. The other compression ring 64 has a plurality of smooth bores 74 aligned with the bores 72 on compression ring 62 to receive the smooth protruding end of the adjustment screws 66 in a compression manner.

Figure 5:
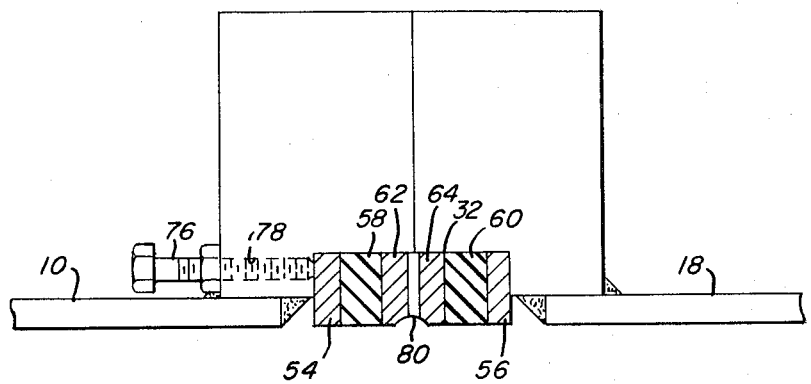
FIG. 5 is a view of a second embodiment of the adjusting screw device.

The embodiment shown in FIG. 5 has an adjusting screw 76 on the outside of the aftercooler flange 34 with a threaded bore 78 therein such that rotation of the adjusting screw 76 will provide compression via the flange 34 to the seal assembly to seal the liquids in the aftercooler and separator in a manner described hereinafter. A leakage detector vent 80 is also provided in the embodiment of FIG. 5 for visual detection of leakages in a manner now described with the embodiment of FIG. 2.

To adjust the expansible joint 16, the securing bolts 48 are firmly tightened against the spacers 46 in a definite parallel relationship to prevent any binding and to provide a secure rigid mounting that will not sag. The circular floating end plate 28 carrying the tube bundle 12 is properly aligned within the soft packing rings 58 and 60 with freedom of transverse motion therein. Leakage between the cooling fluid in piping 10 and the gases in the intake conduit 18 is prevented by proper external adjustment of the adjustment nuts 68 on the adjustment screws 66 at the opening 70. Adjusting the screws 66 regulates the pressure of which the compression rings 62 and 64 bear on the respective soft packing rings 58 and 60 against the respective back up rings 54 and 56 which in turn regulates the degree of pressure of which the soft packing rings 58 and 60 intimately seals against the floating plate 28 to prevent leakage of either the cooling fluid from piping 10 or gases from the intake conduit 18. If due to continued transverse motion of the floating end plate 28 against the soft packing rings 58 and 60 one of said rings began to leak, such leakage would be readily visibly detected at the opening 70 between the compression rings 62 and 64.

Such leakage, when detected can be readily stopped by externally adjusting the screws 66 to in turn further compress the soft packing rings 58 and 60. Further compression of the packing rings 58 and 60 increases the sealing action between said rings and the floating end plate 28 without effecting the rigid alignment of the flanges 34 and 38 thereby preventing cocking of the flanges 34 and 38 and misalignment problems previously encountered with other expansible joints.

The adjustment of the adjusting screw 76 of the embodiment shown in FIG. 5 accomplishes a similar action as that described with reference to FIG. 2 by exerting the compression force on the back up ring 54 to compress the soft packing rings 58 and 60 to increase the sealing action. Any leakage would be through the port 80 which would be readily visibly detected and the proper adjustment of the screw 76 could be made to stop the leakage.

Although I have shown and described only two embodiments of the present invention, different embodiments may be comprised of variations in the location of the adjusting screws, the means for compressing the soft packing seal rings etc. without departing from the spirit and scope of the invention and it is intended that all matter contained in the foregoing description and shown in the accompanying drawings shall be interpreted as illustrative and not in a limiting sense.

What is claimed is:

1. An elongated conduit assembly comprising: a first conduit; a second conduit having at least the portion thereof adjacent said first conduit generally coaxially aligned with respect to said first conduit and spaced therefrom in an axial direction; retaining means carried by said conduits and releasably retaining said conduits in coaxial spaced alignment; interior means axially received within at least a portion of said first conduit sealing means disposed axially intermediate the respective adjacent axial ends of said conduits and radially intermediate a portion of said interior means and said retaining means and being operative in sealing engagement with said interior means and said retaining means to prevent fluid communication between the interior and exterior of said conduits through the space between said respective axial ends; and said sealing means including a first sealing portion spaced in said axial direction from a second sealing portion and adjusting means externally adjustable independent of said retaining means to selectively move said sealing portions in opposite directions to each other.

2. An elongated conduit assembly as specified in claim 1 wherein each of said sealing portions includes coaxially aligned and axially engaging backup, compression and soft packing rings, with said packing rings being located axially intermediate said backup and compression rings.

3. An elongated conduit assembly as specified in claim 1 wherein the space between said first and second sealing portions is visually observable from the exterior of said conduits.

4. A heat exchanger comprising: a first conduit; a second conduit having a least the portion thereof adjacent said first conduit coaxially aligned with respect to said first conduit and spaced therefrom in an axial direction; a heat exchanging tube bundle axially received within at least a portion of said first conduit and having a floating tube header adjacent one end thereof; retaining means carried by said conduits and releasably retaining said conduits in coaxial spaced alignment; sealing means disposed axially intermediate the respective adjacent axial ends of said conduits and radially intermediate a portion of said tube header and said retaining means and being operative in sealing engagement with said tube header and said retaining means to prevent fluid communication between the interior and exterior of said conduits through the space between said respective axial ends; and said sealing means including a first sealing portion spaced from a second sealing portion, and adjusting means externally adjustable independent of said retaining means to selectively move said sealing portions in opposite directions to each other.

* * * * *